July 7, 1970
E. A. PARKER
3,518,821
SELF-POWERED COMBINE TRAILED BY AN INDEPENDENTLY
POWERED RESIDUE CHOPPING UNIT
Filed June 15, 1967
2 Sheets-Sheet 1
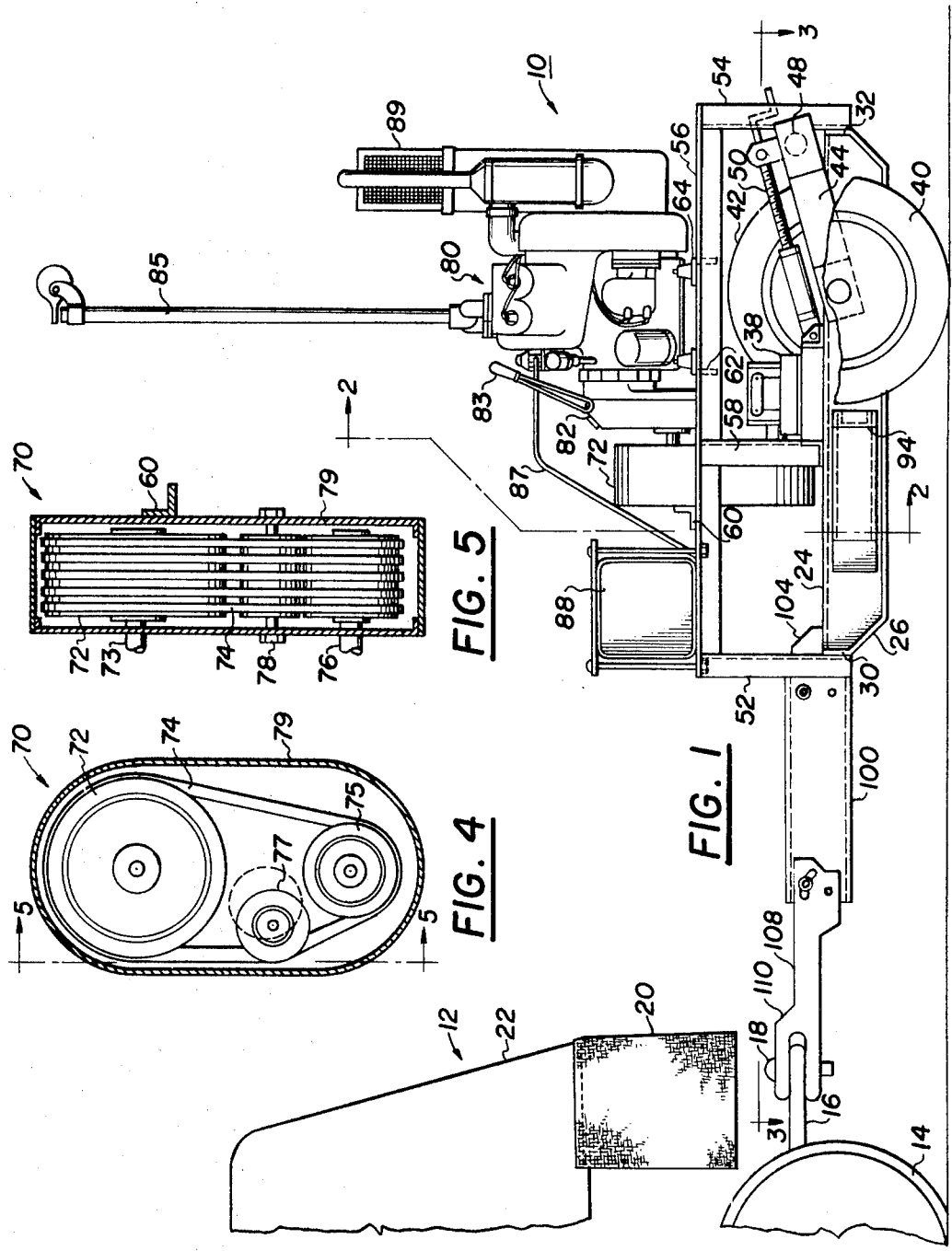
INVENTOR.
EDWIN ALLAN PARKER
BY
ATTORNEY

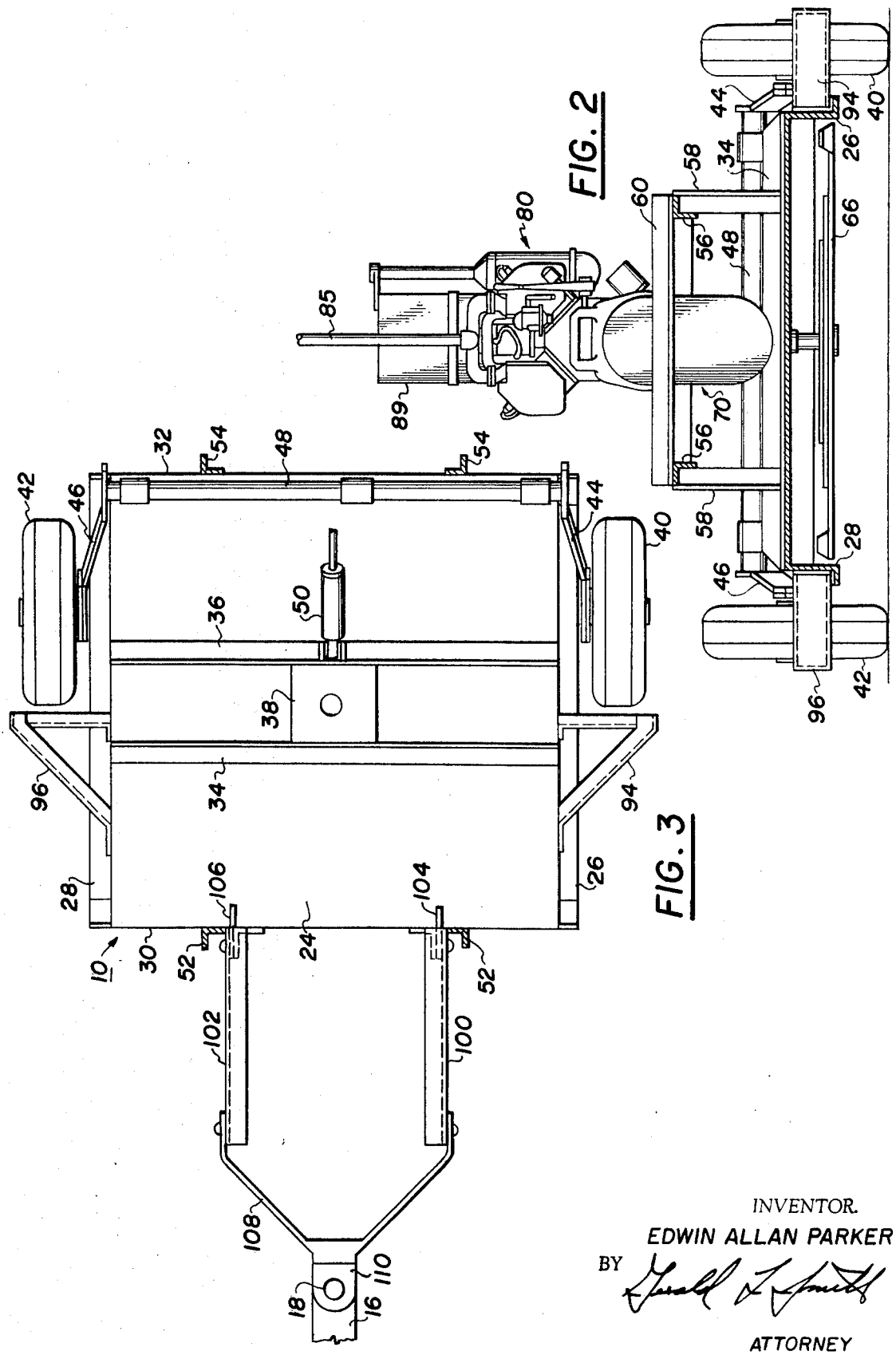

United States Patent Office 3,518,821
Patented July 7, 1970

3,518,821
SELF-POWERED COMBINE TRAILED BY AN INDEPENDENTLY POWERED RESIDUE CHOPPING UNIT
Edwin Allan Parker, 47 Ritters Lane,
Owings Mills, Md. 21117
Filed June 15, 1967, Ser. No. 646,299
Int. Cl. A01d 49/00
U.S. Cl. 56—503
10 Claims

ABSTRACT OF THE DISCLOSURE

A crop residue chopping device comprising a two-wheeled trailer having a rotary chopping blade mounted for horizontal rotation upon its underside. The blade is powered by an internal combustion engine mounted over the trailer wheels on its upper side. The trailer is pivotally attached to and drawn by a self powered harvester-combine in the vicinity of the rearward steering wheels of the combine.

BACKGROUND OF THE INVENTION

Field of the invention

The present invention relates to farming machinery and more particularly to a stalk chopping device and system for treating crop residues during harvesting.

Description of the prior art

The techniques of American farm crop production have been the subjects of intensive investigations over the past three to four decades. These comprehensive inquiries and research efforts initially evolved very basic changes in farming methods, and over the recent past have been observed to introduce more gradual increments of crop production improvement. Throughout the entire developmental period, however, two basic and interrelated improvements have continued to be sought. These are: (a) the development of a higher crop yield, and (b) the lowering of crop production unit costs. Crop yields have been improved with the introduction of highly refined seeds, chemicals and more particularly, with the initiation of new physical farming techniques or methodology. Attendant with these newer techniques, however, are additional and somewhat specialized operations which must be performed on a field or crop at planting or harvesting. These added steps, of course, tend to increase crop production costs and, unless their economic merit is immediately apparent, are often disregarded by the farming community.

The paramount factor found to influence crop production costs is labor. Accordingly, a reduction in labor requirements generally evolves lowered unit costs or at least an adjustment to a continually escalating labor pool cost.

Looking particularly to corn production, in adjusting to rising labor costs, the farm industry has considerably expanded the mechanization of corn harvesting procedures over the past thirty years. The introduction of one-row and two-row mechanical corn pickers in the periods 1910 and 1930, respectively, reduced considerably the labor required to harvest and store an acre of corn. This innovation constituted a basic change as above mentioned. A further reduction in labor requirements was evidenced in the 1950's. At that time, the use of self-propelled corn-picker-shellers and cornpicker attachments on combines was realized as being economically advantageous. In this process, however, machinery investment became very high and an appropriate amortization dictated that harvesting equipment be used to fullest capacity. In order to utilize the now complex and expensive machines more fully and thereby reduce fixed costs, the work has been subcontracted to customized operators or additional acreage has been acquired and planted. Evidence that this enhanced mechanization has been effective may be derived from labor statistics over the subject period. The United States corn yield in 1960–1963 was over 62 bushels per acre or 2½ times the yield in the 1935–1939 period. During this period, manhours of labor for corn harvesting declined 75 percent from about ten hours per acre to about 2.5 hours per acre. This declining trend has now tapered off and, as a consequence, suggested additional field operations or maneuvers must meet rigorous economic standards in order to be accepted and introduced by the industry.

Somewhat recently, agricultural research has affirmatively determined that the plant materials or crop residues remaining in the fields after harvesting, when utilized properly, will contribute immensely to the maintenance and increase of the ever-dwindling soil organic matter and to the reduction of runoff and soil erosion. Tillage methods for handling large quantities of plant residues have been a difficult problem for several years. The residues slow seedbed preparation and planting by raking and "balling up" in front of the plows and planters. As a consequence, the common practice has often been to burn off the residues.

In some farm areas, it has been determined desirable to institute a procedure known as "mulch tillage" wherein the equipment at planting loosens the soil sufficiently to plant the seed, but at the same time leaves the plant residues on the surface as mulch. The first operation in mulch tillage is to cut up or chop the preceding crop residue. This process has been attempted with disk-harrowing procedures, however, in many areas, the residue must be treated with a field chopper, requiring a consequent higher machinery investment.

The treatment of crop residues in either of the above noted instances is now considered highly desirable and has been most recently accomplished with a separate, tractor drawn chopper, thereby introducing an extra, and expense contributing factor in crop production costs. Attempts at incorporating chopping devices within combines or corn pickers so as to eliminate an extra field operation have not met with success for several reasons as follows:

The vibration characteristics inherent in choppers caused by a necessarily violent reaction with plant and soil matter at or near ground level tends to disrupt the already delicate and complex mechanisms of the harvesters. Further, it has been considered necessary to provide continuing operator surveillance of the choppers in order to elevate the chopping mechanism over protrusions in the general ground level. It follows that a separate tractor attachment is required to provide this elevation. Additionally, when incorporated within a modern combine, the combine loses its desirable modular versatility. As a consequence, it becomes more difficult to rationally amortize its already high investment cost.

A concept for attaching a modular stalk or crop residue chopping device at the rear of a combine-picker assembly has heretofore been dismissed for a series of additional reasons: The modern combine must be rearwardly steered. By virtue of its operational design requirements, the combine front wheels drive and support the bulk of the mass of the mechanism of both combine and picker or similar device. As a result, the rear steering wheels of the assembly operate within a relatively narrow weight and balance margin. The addition of a weighted trailing device at the rear steering assembly has heretofore tended to disrupt the steering balance of the combine. This latter effect is particularly in evidence where downhill grades are encountered in the field.

When attached rearwardly of a combine, the already large, bulksome and lengthy arrangement becomes even longer and has been considered difficult to maneuver, the operator situate at the front of the combine being unable to observe the small trailing chopper. Maneuvering problems become apparent when it becomes necessary to back the assembly without observance of the trailer.

In view of the above difficulties, the present crop residue chopping practice is to utilize a tractor drawn and powered chopping device, thereby necessitating a higher labor outlay for the additional field treatment.

Tractor drawn and powered rotary chopping implements have themselves heretofore been characterized by frequent stoppages or downtime resulting from chopper breakdowns. Typically, during a day of field operation, it is necessary to replace in excess of twelve sheared pins within the devices. Generally, the pins are sheared as a result of the tractor-chopper operator being unable to observe or anticipate the vagaries of soil profiles so as to elevate the chopping mechanism. It follows that the added labor required to provide the crop residue chopping function under present practices serves to diminish the gains of soil improvement and higher crop yields otherwise realized from the treatment.

Inasmuch as weather conditions often impose limitations on the number of days available for efficient harvesting, the aforementioned extra step of stalk chopping by separate, tractor-drawn implement is often delayed until an entire crop is harvested. The quality of chopping which can be obtained after this delay is diminished as a result of the residue stalks losing a "spring back" quality extant immediately after the picking sequence. Should rains be encountered after picking, conventional choppers are incapable of performing with the degree of effectiveness otherwise desired, since the stalks no longer will feed with an upright tendency into the chopper blades. The efficiencies otherwise realized from the entire extra crop residue treating step are often compromised as a result of this lowered quality of chopping.

SUMMARY

The inventive device and combination for chopping crop residue as is now presented offers solution to the deficiencies and drawbacks outlined above by providing, inter alia, a novel stalk chopper which may be attached to and drawn by a conventional modern combine during harvesting operations.

The crop residue chopping device is particularly characterized by a design having a mass and dynamic balance allowing for a towable attachment to a self-powered combine without hindering the steering characteristics of the latter's rearwardly disposed guide wheels. As a result of its allowable combination with or attachment to a conventional modern combine-harvesting system, the inventive chopping arrangement serves to eliminate the separate field operation heretofore required in providing crop residue treatment. More particularly, the labor and machinery investment formerly required with tractor towed and powered devices is eliminated with the present invention. The stalk chopping system of the invention, therefore, affords a lowered unit cost for the favorable crop yields now realized from incorporating a crop residue treatment within harvesting procedures.

The novel rotary stalk chopping device is further characterized in having an independent power supply for powering horizontally rotating chopping blades. By appropriate selection of power supplied into the shaft of the aforesaid chopping blades, the chopping mechanism is characterized in adjusting to variations in loadings imposed upon the blades. As a consequence of this independent adjustment to imposed blade loadings, the chopping device is rarely the subject of cost contributing downtime resulting from the severing of shearpins and the like.

Contrary to a priori predictions, the trailing crop residue chopping device of the invention has been found to adopt readily to combine-harvester backing movements. By incorporating a relatively simple position indicating implement into its structure, and making advantageous use of the characteristics derived from rearwardly positioned combine steering wheels, the chopper-harvester system of the invention is maneuverable with little added operator effort.

The inventive arrangement provides particular advantage by virtue of its position behind a combine-harvester. Since the stalks jutting from the ground retain their highest "spring back" quality or resiliance immediately following the passage of the combine, the chopper device of the invention is operating upon crop residues at their most optimum physical state. As a result, the quality of crop residue treatment afforded by the system of the invention is considerably enhanced. Additionally, the chopping device is advantageously positioned for breaking down husks and the like issuing from the rear of the combine. A delay otherwise encountered in the chopping procedure would permit the rejected husks to become embedded at the ground level in entangled positions immune from the action of the chopping blades.

The crop residue chopping implement of the invention is further characterized by its very simple design and consequent low cost of manufacture. As a result of its low cost, the chopping device of the system is assessible to the capital structures of a broad spectrum of farm enterprises. The simple basic design of the chopping device is also found to lend itself to facile maintenance procedures.

It is a further object of the invention to provide a cornstalk chopping device characterized in having a horizontally rotating chopper blade powered by an independent motor of preselected power which is, in turn, balanced over a pair of supporting wheels.

The above and other objects and advantages of the invention will be apparent from the following detailed description taken together with the accompanying drawings.

BRIEF DESCRIPTION OF THE DRAWINGS

FIG. 1 is a side elevational view with portions partially broken away showing the crop residue chopping device of the invention in appropriate attachment with the rearward portion of a harvester-combine.

FIG. 2 is a sectional front elevational view of the crop residue chopping device taken along the vertical plane of line 2—2 of FIG. 1.

FIG. 3 is a top sectional view of the crop residue chopping device taken along the horizontal plane shown as line 3—3 of FIG. 1.

FIG. 4 is a sectional view of the power driving assembly of the chopping device of the invention.

FIG. 5 is a sectional view of the power driving assembly taken along the plane of line 5—5 in FIG. 4.

DESCRIPTION OF THE PREFERRED EMBODIMENTS

Looking to FIG. 1, a crop residue chopping device shown generally at 10 is depicted in pivotal connection with the rearward portion of a conventional self-propelled harvester-combine generally indicated at 12. The device is adapted for towing behind the combine 12 by pivotal attachment thereto a distance along a centerline behind the rear steering wheels 14 selected so as to allow ample pivoting clearance during the backing and turning movements of the entire assembly. For this purpose, it is desirable to install hitching means comprising a horizontal extension hitch member as at 16, the forward portion of which is connected to the combine rear-wheel suspension cross member at its midpoint between the wheels 14. It has been determined empirically that by positioning the rearwardly disposed hitch and pin 18 assembly about eight inches beyond the outermost rearward edge of wheel 14 along with a later described trailer hitch extension, there is provided a necessary clearance and balance between the combine 12 and chopper 10. The conventional combine-harvester for use with the present invention is further modified by the provision of a ducting extension means shown as a skirt 20 at the lower edge of the crop wastage exhaust duct 22. Skirt 20, which may be fashioned from a conveniently flexible material such as canvas, is removably attached to and wrapped around the lower outer periphery of duct 22 so as to cause wastage such as corn husks or the like issuing therefrom to be expelled to the ground directly in front of the chopper 10.

As is illustrated in connection with FIGS. 1 through 3, the chopping device 10 is fashioned having a square base or platform 24 formed of sheet stock, the side portions of which may be bent to provide structural channels as at 26 and 28. Lateral buttressing of the platform 24 is provided by both front and rear edge flanges 30 and 32 as well as by welded transverse angles 34 and 36 disposed respectively about the front and back sides of blade shaft and gear housing 38. The wheels 40 and 42 are journaled respectively upon arms 44 and 46 which, in turn, are supported at the rear of the platform by a tubular member 48. By virtue of its connection with a suitable adjusting mechanism 50, the arms 44 and 46 may be pivoted about the axis of member 48 so as to provide any desired elevation of the platform with respect to the level of the ground.

An elevated frame serving as a means mounting an engine is welded upon the platform 24 and may be fashioned from conventional angle stock. The frame illustrated is situated so as to support the motor assembly generally indicated at 80 in a position essentially distributing its weight over the axis of the wheels 40 and 42. Upstanding angle members as at 52 situated at the foreward end of platform and angle members as at 54 located at the rear of the platform serve to support the longitudinally disposed motor supporting angle members 56. Additional vertical support is provided at the foreward end of the motor assembly by upstanding angle members as at 58, while lateral bracing is supplied by transverse angle members as at 60, 62 and 64, the latter two members serving the additional function as motor mounts.

Conventionally housed beneath the platform 24 is a rotary cutting blade 66 which is powered from a motor arrangement described later and a power transfer means including typical step-up gearing within the housing 38 and power train 70. It is generally desirable to operate the blade from between about 600 r.p.m. to 800 r.p.m.

Power is transmitted into the gearing at 38 from a power train arrangement generally depicted at 70. The train 70 preferably comprises a V-belt and pulley or sheave system as is illustrated in detail in connection with FIGS. 4 and 5. Rotative motive power from the motor assembly 80 is imparted to five parallel driving sheaves 72 through a shaft 73 to which they are secured. V-belts forming a belt drive 74 transmits power from sheaves 72 to sheaves 75 which are, in turn, secured to a shaft 76 extending into the gear housing 38. Idler pulleys 77 journaled to an adjustable shaft 78 serve the function of imposing a desired tension upon the belt drive 74. A protective housing 79 is fashioned from sheet stock to surround the entire belt drive system.

The power train 70 is interconnected to the motor assembly 80 through clutch means including a conventional clutch 82 which is engaged by the manual actuation of handle 83.

An important aspect of the invention resides in the positioning of the motor assembly 80 upon the platform such that its center of gravity is somewhat centered over the axis of wheels 40 and 42. By providing a mass balance over these wheels it has been found that the steering characteristics of the combine-harvester 12 are not impaired. Motor assembly 80 is particularly characterized in having an extended vertical exhaust stack 85 which juts above the upper level of combine 12. Thusly extended, the slack 85 has been found to serve as an effective guide for the combine operator during backing maneuvers. The motor illustrated is a conventional, four cylinder internal combustion engine having a fuel feed along conduit 87 emanating from a fuel tank 88.

Another important aspect of the instant invention lies in the selection of power rating for the power supply of the unit such as the aforedescribed motor. By selecting a relatively lower powered motor in the range between about 17 to 30 horesepower, the rotating blade 66 will momentarily slow down upon encountering soil profile aberrations. This characteristic of inherently slowing down down has been observed to allow the entire trailing assembly to be pulled or forced over obstructions without endangering the blade assembly and without causing the severance of shear pins. As a result, the device need not be stopped and elevated over obstructions as are generally encountered in the field, and the elevating devices conventionally required with separate tractor drawn and powered choppers are not necessary.

The above aspect of the invention provides another important factor in justifying and permitting the attachment of the chopping device to the harvester-combine.

Of course, the incorporation of lower powered motors with the chopper device results in advantageously lower costs of manufacture.

The motor assembly 80 otherwise is of typical design, generally being hand crank started and incorporating such implements as an air intake filter 89.

Attached to the side structural channels 26 and 28 of the platform 24 are triangular shaped deflectors 94 and 96 formed from angle stock. These deflectors serve as a bumper means to protect wheels 40 and 42 from fouling crop debris and additionally are made strong enough to laterally deflect the entire trailer assembly should it encounter a fixed obstruction such as a stump or the like during operation. It will be apparent that the presence of the deflectors 94 and 96 contributes to minimizing the need for any operator surveillance during the harvesting process.

The chopping device is further inventively characterized by the presence of means spacing platform 24 rearwardly from duct 22 and skirt 20 sufficiently to allow expulsion of the plant residue from the combine forwardly of the platform, including an elongated trailer hitch extension at its forward end. The extension is fashioned from two channel members 100 and 102 which are attached by welding or bolting respectively to brackets 104 and 106, which are, in turn, welded to the platform 24. A conventional Y-shaped draw-bar 108 having a female hitching portion 110 is bolted to the outwardly protruding ends of the channels 100 and 102 to complete the assembly. The extended hitch arrangement as described serves the important function of establishing adequate distance between the pivot at pin 18 and the axis of wheels 40 and 42. A desirable distance has been determined to range from about 7 to 9 feet. This proportioning not only serves the apparent function of providing adequate separation from the combine-harvester, but also establishes a desirable rate of response to turning movements initiated within the combine-harvester during backing maneuvers.

The crop residue chopping implement above described, while of very simple design, affords a significant monetary savings in the unit costs of harvesting. The simple expedient of attaching such a device to the rear of a combine-harvester has heretofore been dismissed as impractical by the industry. By virtue of the simple, but effective design innovations now described, however, not only is the combine-chopper a practical combination, but also the quality of crop residue chopping has been found to be improved. The latter improvements is considered to result from the inherently close proximity of chopping action to the combine-harvester function.

It will be apparent to those skilled in the art that many variations may be made in the detailed disclosure set out herein for illustrative purposes, without departing from the sprit or scope of the invention.

I claim:
1. In combination with a self-powered combine-harvesting unit characterized in having rearwardly disposed steering wheels and plant residue exhaust duct, the improvement comprising:
a crop residue chopping device
  (a) pivotably connected in towable fashion to the rear of said unit in the vicinity of the midpoint between the said combine steering wheels;
  (b) said device having a rigid support platform disposed in a generally horizontal plane; means spacing said platform rearwardly from said exhaust duct a distance sufficient to allow the expulsion of said plant residue from said combine forwardly of said platform;
  (c) at least two freely rotatable ground engaging wheels mounted upon said platform and adapted to support said platform for rotation about substantially a common axis a selected height above ground level;
  (d) an internal combustion engine and means mounting said engine upon said platform in a position essentially distributing its weight over the axis of said wheels;
  (e) engine fuel supply means mounted upon said platform and in fuel supplying connection with said engine;
  (f) at least one elongate rotatable crop residue chopping blade disposed within a plane parallel to said platform and mounted thereunder so as to turn about an axis normal to said plane;
  (g) power transfer means in connection between said engine and said chopping blade for causing the rotation of said blade and imparting thereto a preselected rotative power; and
  (h) upstanding elongate position indicator means depending perpendicularly upwardly from said platform and adapted to visually appraise the operator of said combine-harvesting unit of the alignment and position of said chopping device therewith.

2. The combination of claim 1 in which said internal combustion engine is selected having a power output rated at between about 17 H.P. and 30 H.P.

3. The combination of claim 1 including removable ducting extension means in attachment with said combine plant residue exhaust duct for directing said residue to ground level in front of the said chopping device platform.

4. The combination of claim 1 in which said position indicator means is formed as an extension of the exhaust stack of said internal combustion engine.

5. The combination of claim 1 including clutch means intermediate said internal combustion engine and said power transfer means.

6. The combination of claim 5 wherein said wheels mounted upon said chopping device platform are spaced rearwardly from said pivotal connection a distance of about 7 to 9 feet.

7. The combination of claim 5 including fixed outwardly protruding bumper means in attachment with said platform forwardly of said platform mounted wheels for providing protection to the wheels during the forward motion of the said chopping device.

8. In combination with a self-powered combine-harvesting unit characterized in having rearwardly disposed steering wheels and plant residue exhaust duct, a crop residue chopping device comprising:
hitching means for removably connecting said chopping device in towable fashion with said unit at a centerline extending through about the midpoint between said combine steering wheels;
a rigid support platform disposed in a generally horizontal plane;
means connectable between said platform and said hitching means for spacing said platform rearwardly from said exhaust duct a distance sufficient to allow the expulsion of said plant residue from said combine forwardly of said platform;
at least two freely rotatable ground engaging wheels mounted upon said platform for rotation about substantially a common axis and adapted to support said platform a selected height above ground level;
at least one rotatable crop residue chopping blade disposed within a plane parallel to said platform and mounted thereunder so as to turn about an axis normal to said plane;
motor means for imparting a preselected motive power to said at least one chopping blade; and
means mounting said motor means in a position essentially distributing its weight over the axis of said wheels;
power transfer means in connection between said motor means and said at least one chopping blade for causing the rotation of said blade under said motive power.

9. The combination of claim 8 wherein said crop residue chopping device further includes position indicator means connectable therewith for visually apprising the operator of said combine-harvesting unit of the alignment and position of said chopping device therewith.

10. The combination of claim 8 wherein said crop residue chopping device further includes bumper means protruding from said platform forwardly of said ground engaging wheels for providing protection to the wheels during the forward motion of the said chopping device.

References Cited

UNITED STATES PATENTS

| 2,278,922 | 4/1942 | Goodall | 56—25.4 |
| 2,312,972 | 3/1943 | Orr | 56—25.4 |
| 3,387,446 | 6/1968 | Kasper | 56—503 |

FOREIGN PATENTS

| 644,364 | 7/1962 | Canada. |

F. BARRY SHAY, Primary Examiner

U.S. Cl. X.R.

56—25.4; 130—27